(12) United States Patent
Manabe et al.

(10) Patent No.: US 7,356,253 B2
(45) Date of Patent: Apr. 8, 2008

(54) ROTATIONAL DRIVING APPARATUS AND CAMERA USING THE ROTATIONAL DRIVING APPARATUS

(75) Inventors: Mitsuo Manabe, Saitama (JP); Kazuhiro Tsuyuki, Saitama (JP)

(73) Assignee: Fujinon Corporation, Saitama (JP)

( * ) Notice: Subject to any disclaimer, the term of this patent is extended or adjusted under 35 U.S.C. 154(b) by 405 days.

(21) Appl. No.: 11/081,697

(22) Filed: Mar. 17, 2005

(65) Prior Publication Data
US 2005/0212959 A1  Sep. 29, 2005

(30) Foreign Application Priority Data
Mar. 24, 2004  (JP) ............... P.2004-087900

(51) Int. Cl.
*G02B 7/04* (2006.01)
*F16C 23/06* (2006.01)
*F16C 27/04* (2006.01)

(52) U.S. Cl. .............. 396/144; 384/249; 384/611

(58) Field of Classification Search ........ 384/223, 384/225, 249, 610, 611, 616; 74/89.14; 396/72, 396/85, 144, 348, 349
See application file for complete search history.

(56) References Cited

U.S. PATENT DOCUMENTS

| | | | | |
|---|---|---|---|---|
| 821,699 A | * | 5/1906 | Broomall | 384/616 |
| 1,898,945 A | * | 2/1933 | Fitzgerald | 279/22 |
| 4,987,791 A | * | 1/1991 | Nakahashi et al. | 74/425 |

FOREIGN PATENT DOCUMENTS

JP  2001-309610  11/2002

* cited by examiner

Primary Examiner—W. B. Perkey
Assistant Examiner—Rishi Suthar
(74) Attorney, Agent, or Firm—Harness, Dickey & Pierce, P.L.C.

(57) ABSTRACT

A rotational driving apparatus with a motor, a worm pressingly fitted to an output shaft of the motor, and a worm wheel meshing with the worm, is provided to output rotation of the motor from the worm wheel via the worm. The apparatus includes support, pressing, plug, and urging members. The support member is placed forming a gap with respect to a tip end of the worm, and includes a through hole positioned on a same axis as the worm. The pressing member is inserted into the through hole, and protrudes from a tip end of the through hole to butt against a tip end face of the worm. The plug member is fitted into the through hole to close the through hole, in which its fitting degree into the through hole is adjustable. The urging member is interposed between the pressing member and the plug member to urge the pressing member toward the worm.

5 Claims, 4 Drawing Sheets

ROTATIONAL DRIVING APPARATUS AND CAMERA USING THE ROTATIONAL DRIVING APPARATUS

BACKGROUND OF THE INVENTION

1. Field of the Invention

The present invention relates to a rotational driving apparatus and a camera using the rotational driving apparatus, and more particularly to a rotational driving apparatus to be used as a rotational driving source for a lens device in which a lens is moved forward and backward along the optical axis by a cam mechanism, and a camera using the rotational driving apparatus.

2. Description of the Related Art

In the case where rotation of a motor is to be decelerated at once, for example, a worm gear is usually used. A worm gear consists of a worm and a worm wheel. In the case where rotation of a motor is to be decelerated at once, a worm is previously attached to an output shaft of the motor, and rotation of the motor is transmitted to a worm wheel which meshes with the worm, thereby immediately decelerating the rotation.

Usually, a worm is attached to an output shaft of the motor by press fitting. There is a possibility that the press fitting is loosened as a result of a long term use and the worm moves on the output shaft to slip off from the output shaft.

In JP-A-2001-309610, therefore, the tip end of a worm which is press fitted to an output shaft of a motor is pressed by a pressing member such as a spring, thereby preventing the worm from slipping off.

In the worm supporting structure disclosed in JP-A-2001-309610, however, the pressing force which is applied to the worm by the pressing member cannot be adjusted, and hence there is a drawback that, when the components have a dimensional error, an adequate pressing force cannot be applied to the worm. As a result, the structure has drawbacks that an excessive pressing force is applied to the worm to produce a friction loss, and that, when the pressing force is insufficient, backlash occurs in the worm.

SUMMARY OF THE INVENTION

The invention has been conducted in view of such circumstances. It is an object of the invention to provide a rotational driving apparatus which can stably perform a driving operation, and a camera using the rotational driving apparatus.

(1) In order to attain the object, the invention provides a rotational driving apparatus which comprises a motor, a worm that is pressingly fitted to an output shaft of the motor, and a worm wheel that meshes with the worm, so as to output rotation of the motor from the worm wheel via the worm, wherein the rotational driving apparatus comprises: a support member that is placed with forming a gap with respect to a tip end of the worm, the support member comprising a through hole positioned on a same axis as the worm; a pressing member that is inserted into the through hole, and protrudes from a tip end of the through hole to butt against a tip end face of the worm; a plug member that is fitted into the through hole to close the through hole, and in which a degree of a fitting of the plug member into the through hole is adjustable; and an urging member that is interposed between the pressing member and the plug member to urge the pressing member toward the worm.

According to the invention, the tip end face of the worm is axially pressed by the pressing member which is urged by the urging member. In the urging member which urges the pressing member, the urging force can be adjusted by changing the degree of the fitting of the plug member. Therefore, an adequate pressing force can be applied to the worm.

(2) In order to attain the object, the invention provides a rotational driving apparatus wherein, in the apparatus of (1), the pressing member is formed into a spherical shape.

According to the invention, the pressing member is formed into a spherical shape. As a result, the pressing member makes point contact with the tip end face of the worm, and hence the friction loss can be suppressed to a minimum level.

(3) In order to attain the object, the invention provides a rotational driving apparatus wherein, in the apparatus of (1) or (2), the plug member is a male thread which is screwed with a female thread portion formed in an inner periphery of the through hole.

According to the invention, the plug member is configured by a male thread, and the degree of the fitting into the through hole is adjusted by changing the fastening position or the thread length.

(4) In order to attain the object, the invention provides a rotational driving apparatus wherein, in the apparatus of (2) or (3), the tip end face of the worm comprises a recess having a hemispherical shape.

According to the invention, the tip end face of the worm comprises a recess having a hemispherical shape. Therefore, the pressing member which has a spherical shape can be always caused to butt against the center of the worm, and hence a stable pressing force can be applied without causing eccentricity.

(5) In order to attain the object, the invention provides a lens; and a cam mechanism that operates by receiving a rotational driving force from a rotational driving apparatus of (1), (2), (3), or (4), wherein the lens is moved forward and backward along an optical axis by the cam mechanism.

According to the invention, the rotational driving apparatus of (1), (2), (3), or (4) is used as a rotational driving source for the lens device in which a lens is moved forward and backward along the optical axis by a cam mechanism. In a lens device in which a lens is moved by a cam mechanism, the operating power is changed at the inflection point of a cam. When the rotational driving apparatus of (1), (2), (3), or (4) is used as a rotational driving source, however, abnormal noises and vibrations are suppressed, so that stable driving is enabled.

DETAILED DESCRIPTION OF THE INVENTION

Hereinafter, the best mode for carrying out the rotational driving apparatus of the invention, and a camera using the rotational driving apparatus will be described in detail with reference to the accompanying drawings.

Figure 1:
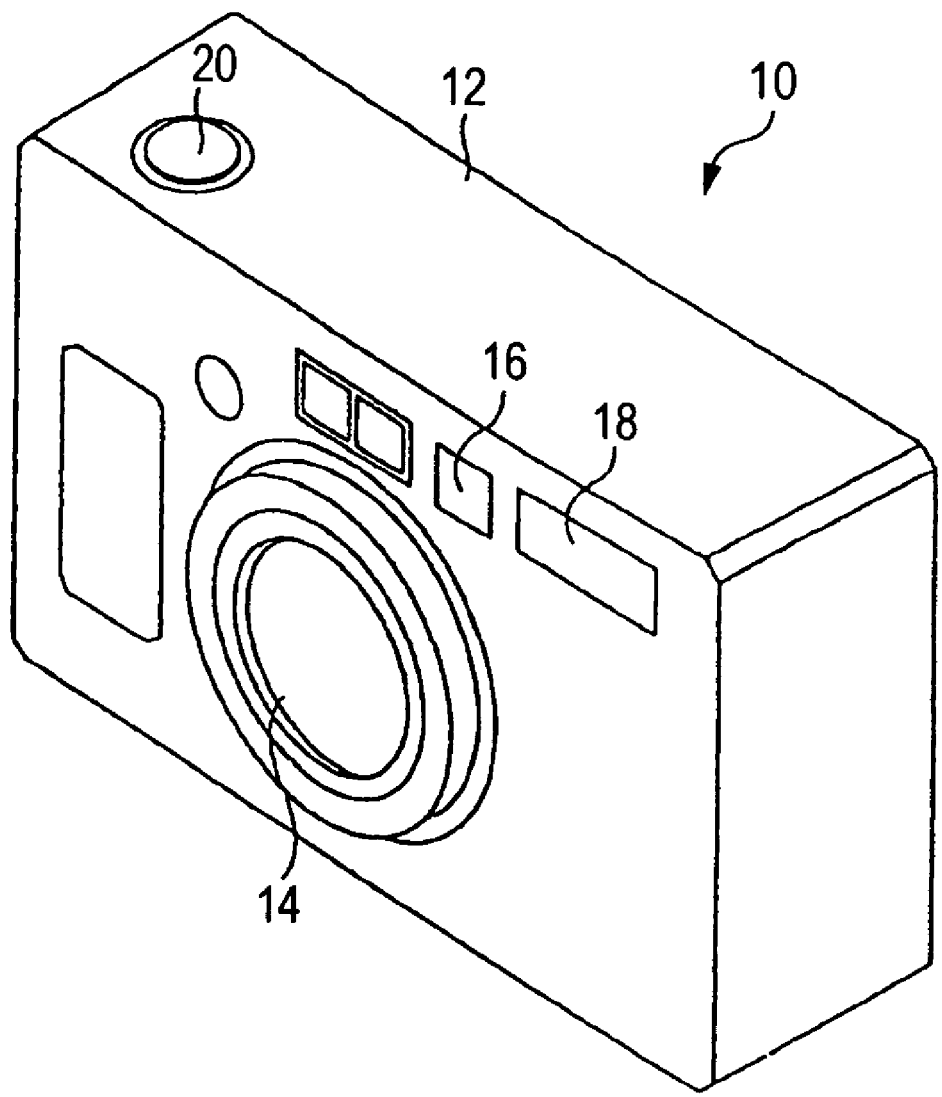
FIG. 1 is a perspective view showing the external configuration of a camera using the rotational driving apparatus of the invention.

FIG. 1 is a perspective view showing the external configuration of a camera using the rotational driving apparatus of the invention. The camera 10 is a film camera which uses a 135 film. An imaging lens 14, a finder window 16, a strobe flash 18, and the like are disposed on the front face of the camera body 12. A shutter release button 20 is disposed on the upper face of the camera body 12, and a power switch, a zoom button, and the like are disposed on the back face of the camera body 12 which is not shown.

The imaging lens 14 is configured by a collapsible type zoom lens. When the power supply of the camera 10 is turned ON, the lens advances from the front face of the camera body 12, and then stops at the wide-angle end. When the power supply of the camera 10 is turned OFF, the lens is housed in the camera body 12. When the zoom button is operated, the imaging lens 14 protruding from the camera body 12 is zoom-driven so that the focal length is changed.

Figure 2:
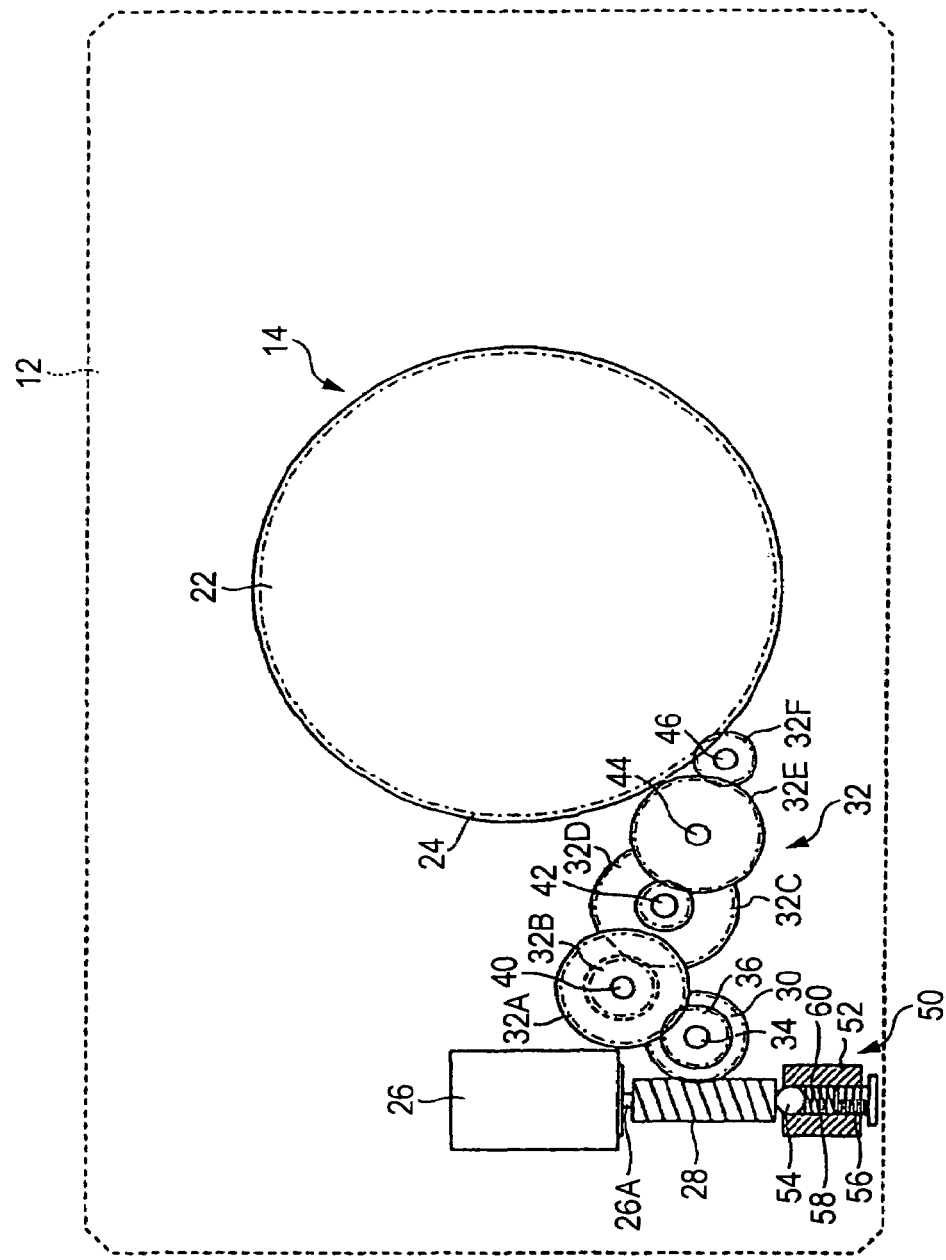
FIG. 2 is a view schematically showing the configuration of a zoom driving portion for an imaging lens.

FIG. 2 is a view schematically showing the configuration of the zoom driving portion for the imaging lens 14. In the imaging lens 14, when an operating gear 24 formed on the outer periphery of a lens barrel 22 is rotated, the lens barrel 22 is caused to extend or contract along the optical axis by the function of a cam mechanism which is not shown, whereby the focal length is changed. The operating gear 24 is rotated by a zoom motor 26.

The zoom motor 26 is fixed to a camera body frame which is not shown. A worm 28 is attached to an output shaft 26A of the motor. A worm wheel 30 meshes with the worm 28, and rotation of the zoom motor 26 is transmitted from the worm wheel 30 to the operating gear 24 via a reduction gear train 32.

The worm 28 is formed into a hollow shape, and attached to the output shaft 26A of the zoom motor 26 by pressingly fitting the output shaft 26A into the hollow portion.

The worm wheel 30 is rotatably supported by a shaft 34 formed on the camera body frame which is not shown. A small-diameter output gear 36 is formed coaxially with the upper face of the worm wheel 30 in an integral manner.

The reduction gear train 32 is configured by first to sixth gears 32A to 32F. The first gear 32A is rotatably supported by a shaft 40 formed on the camera body frame which is not shown, and meshes with the output gear 36. The second gear 32B having a small diameter is formed coaxially with the lower face of the first gear 32A in an integral manner.

The third gear 32C is rotatably supported by a shaft 42 formed on the camera body frame which is not shown, and meshes with the second gear 32B. The fourth gear 32D having a small diameter is formed coaxially with the upper face of the third gear 32C in an integral manner.

The fifth gear 32E is rotatably supported by a shaft 44 formed on the camera body frame which is not shown, and meshes with the fourth gear 32D.

The sixth gear 32F is rotatably supported by a shaft 46 formed on the camera body frame which is not shown, and meshes with the fifth gear 32E, and also with the operating gear 24.

Rotation of the output shaft 26A of the zoom motor 26 is transmitted from the worm 28 to the worm wheel 30, and then from the worm wheel 30 to the operating gear 24 via the reduction gear train 32, whereby the imaging lens 14 is driven.

As described above, the attachment of the worm 28 to the output shaft 26A of the zoom motor 26 is realized by press fitting onto the output shaft 26A. Consequently, there is a possibility that the fitting is loosened as a result of a long term use and the worm slips off from the output shaft 26A. In order to prevent the worm 28 from being loosened, a worm supporting mechanism 50 which axially presses the worm 28 to support it is disposed in a tip end portion of the worm 28.

Figure 3:
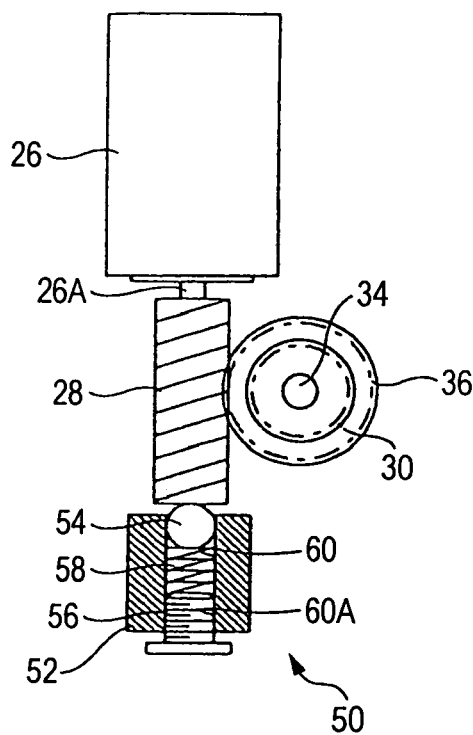
FIG. 3 is a view showing the configuration of a worm supporting mechanism.

FIG. 3 is a view showing the configuration of the worm supporting mechanism 50. As shown in the figure, the worm supporting mechanism 50 is configured by a worm supporting mechanism body 52, a rigid ball 54, a screw 56, and a coil spring 58.

The worm supporting mechanism body 52 is formed into a block-like shape, and placed with forming a predetermined gap with respect to the tip end face of the worm 28 which is press fitted onto the output shaft 26A. The worm supporting mechanism body 52 is fixed to the camera body frame which is not shown. A through hole 60 is formed in the body so as to be coaxial with the worm 28.

The rigid ball 54 is inserted into the through hole 60 formed in the worm supporting mechanism body 52, and protrudes from the tip end face of the through hole 60 to butt against the tip end face of the worm 28.

A female thread portion 60A is formed in the inner periphery of a basal end portion of the through hole 60. The screw 56 is screwed with the female thread portion 60A of the through hole 60.

The coil spring 58 is interposed between the rigid ball 54 and the screw 56. The rigid ball 54 is urged by the coil spring 58 to axially press the tip end face of the worm 28.

When the screw 56 is deeply fastened to the female thread portion 60A, the coil spring 58 exerts a large urging force, and, when the screw 56 is shallowly fastened, the coil spring 58 exerts a small urging force. Namely, the degree of the urging force exerted by the coil spring 58 can be adjusted in accordance with the fastening position of the screw 56. As a result, it is possible to adjust the pressing force exerted by the rigid ball 54.

In the thus configured zoom driving portion for the imaging lens 14 of the camera 10 of the embodiment, when the zoom motor 26 is driven to rotate the output shaft 26A, the rotation of the output shaft 26A is transmitted from the worm 28 to the worm wheel 30, and then from the worm wheel 30 to the operating gear 24 via the reduction gear train 32. As a result, the imaging lens 14 is driven, and the lens barrel 22 is caused to extend or contract along the optical axis by the function of the cam mechanism which is not shown, whereby the focal length is changed.

In this case, the worm 28 is always axially pressed by the rigid ball 54 of the worm supporting mechanism 50, and hence is not loosened, so that stable rotation can be always ensured.

The degree of the pressing force which is applied form the rigid ball 54 to the worm 28 can be adjusted by the fastening position of the screw 56. Even when the accuracies of the components are dispersed, therefore, a pressing force which is optimum for each product can be always applied, and stable operation can be ensured.

Since the component which presses the tip end face of the worm 28 is the rigid ball 54, the rigid ball 54 makes point contact with the worm 28. Therefore, the friction loss can be suppressed to a minimum level, so that the driving operation can be efficiently performed.

Figure 4:
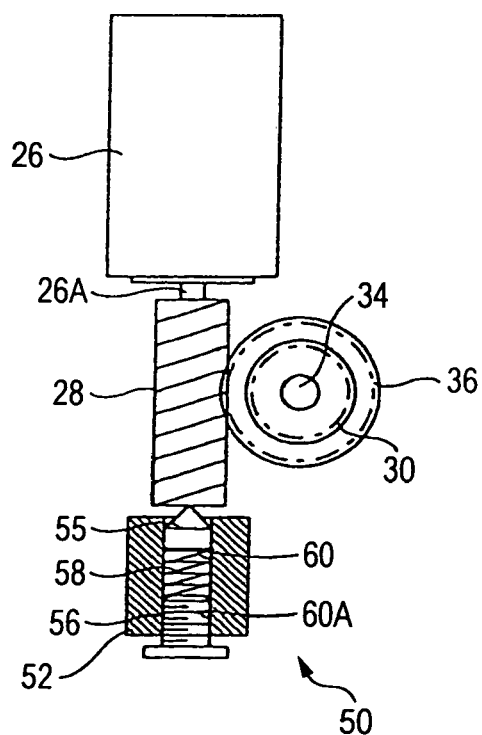
FIG. 4 is a view showing another embodiment of the worm supporting mechanism.

In the embodiment, the component which presses the tip end face of the worm 28 is the rigid ball 54. However, the component which presses the tip end face of the worm 28 is not restricted to this. When a friction loss is considered, however, it is preferable to employ a configuration where the member makes point contact with the tip end face of the worm 28 as in the embodiment. As shown in FIG. 4, for example, a pressing member 55 in which a tip end portion has a conical shape may press the tip end face of the worm 28.

Figure 5:
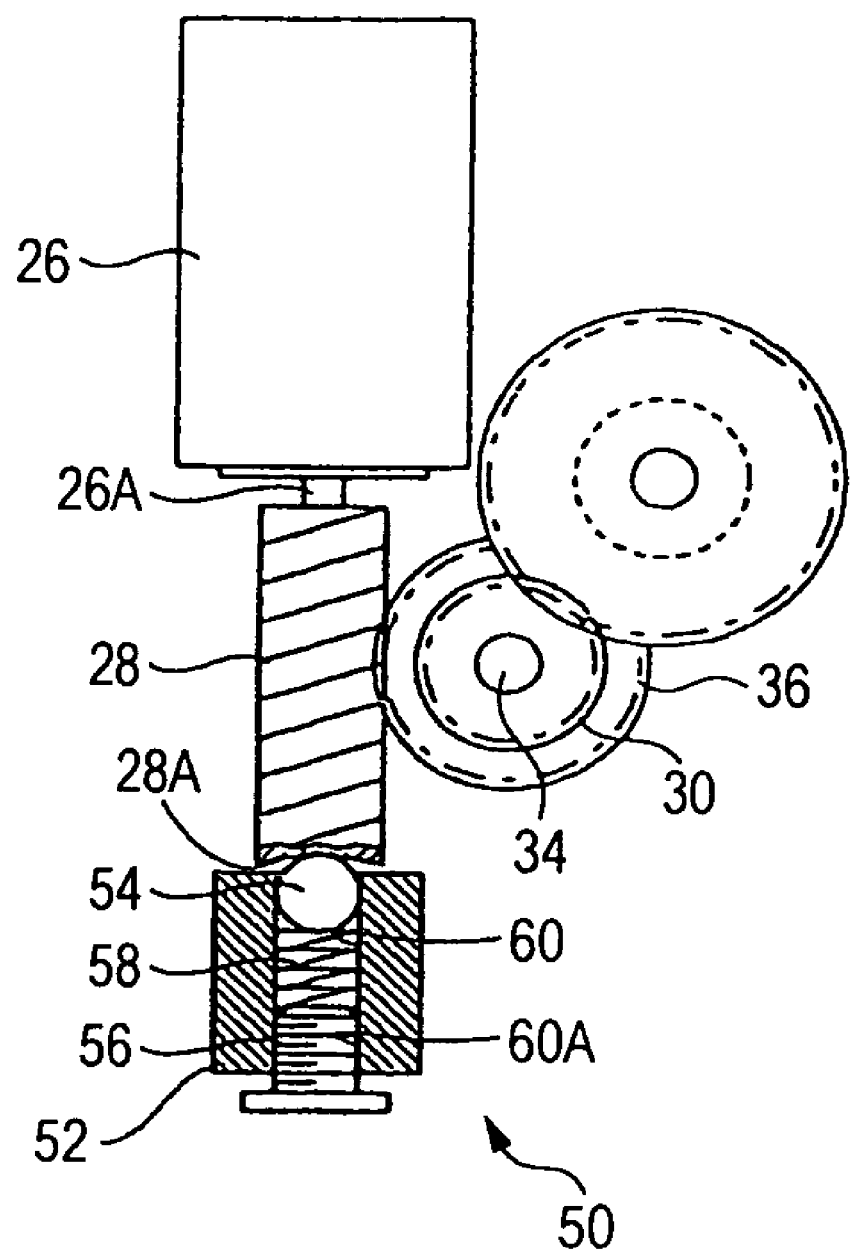
FIG. 5 is a view showing a further embodiment of the worm supporting mechanism.

In the case where the component which presses the tip end face of the worm 28 is the rigid ball 54, the tip end face 28A of the worm 28 may be formed into a hemispherical shape as shown in FIG. 5. According to the configuration, the rigid ball 54 is always caused to press the center of the worm 28 by the centripetal action of the tip end face, whereby stable rotation of the worm 28 can be always ensured.

In the embodiment, the screw 56 is used as the plug member which closes the basal end portion of the through hole 60 formed in the worm supporting mechanism body 52. The plug member is requested only to have a configuration in which the degree of fitting (fitting depth) into the through hole 60 is adjustable, and is not restricted to the screw 56.

In the embodiment, the degree of fitting into the through hole 60 is adjusted by the fastening position of the screw 56. Alternatively, the degree of fitting into the through hole 60 may be adjusted by using screws of different lengths.

In the above, the embodiment in which the invention is applied to a zoom driving portion of a camera has been exemplarily described. The application of the invention is not restricted to this, and the invention can be similarly applied to other machines.

In the rotational driving apparatus of the invention, and a camera using the rotational driving apparatus, it is possible to stably perform a driving operation.

The entire disclosure of each and every foreign patent application from which the benefit of foreign priority has been claimed in the present application is incorporated herein by reference, as if fully set forth.

What is claimed is:

1. A rotational driving apparatus which comprises a motor, a worm that is pressingly fitted to an output shaft of the motor, and a worm wheel that meshes with the worm, so as to output rotation of the motor from the worm wheel via the worm, wherein the rotational driving apparatus comprises:

a support member that is placed with forming a gap with respect to a tip end of the worm, the support member comprising a through hole positioned on a same axis as the worm;

a pressing member that is inserted into the through hole, and protrudes from a tip end of the through hole to butt against a tip end face of the worm;

a plug member that is fitted into the through hole to close the through hole, and in which a degree of a fitting of the plug member into the through hole is adjustable; and an urging member that is interposed between the pressing member and the plug member to urge the pressing member toward the worm.

2. A rotational driving apparatus according to claim 1, wherein the pressing member is formed into a spherical shape.

3. A rotational driving apparatus according to claim 1, wherein the plug member is a male thread which is screwed with a female thread portion formed in an inner periphery of the through hole.

4. A rotational driving apparatus according to claim 2, wherein the tip end face of the worm comprises a recess having a hemispherical shape.

5. A camera comprising:

a lens; and a cam mechanism that operates by receiving a rotational driving force from a rotational driving apparatus according to claim 1, wherein the lens is moved forward and backward along an optical axis by the cam mechanism.

* * * * *